United States Patent
Johnson, Jr. et al.

(10) Patent No.: US 8,469,277 B2
(45) Date of Patent: Jun. 25, 2013

(54) METHODS, SYSTEMS AND COMPUTER PROGRAM PRODUCTS FOR WIRELESS PAYMENT TRANSACTIONS

(75) Inventors: William S. Johnson, Jr., Sunnyvale, CA (US); Ming-Li Liu, Foster City, CA (US)

(73) Assignee: MasterCard International Incorporated, Purchase, NY (US)

( * ) Notice: Subject to any disclaimer, the term of this patent is extended or adjusted under 35 U.S.C. 154(b) by 1201 days.

(21) Appl. No.: 11/641,556

(22) Filed: Dec. 19, 2006

(65) Prior Publication Data

US 2008/0027815 A1    Jan. 31, 2008

Related U.S. Application Data

(60) Provisional application No. 60/834,224, filed on Jul. 28, 2006.

(51) Int. Cl.
*G06K 19/06* (2006.01)

(52) U.S. Cl.
USPC ........... 235/492; 235/380; 235/449; 235/451; 235/493

(58) Field of Classification Search
USPC .................. 235/380, 451, 492, 383, 449, 493
See application file for complete search history.

(56) References Cited

U.S. PATENT DOCUMENTS

| | | | |
|---|---|---|---|
| 6,776,332 B2 * | 8/2004 | Allen et al. | 235/380 |
| 6,824,064 B2 * | 11/2004 | Guthery et al. | 235/492 |
| 2004/0118930 A1 * | 6/2004 | Berardi et al. | 235/492 |
| 2004/0127256 A1 * | 7/2004 | Goldthwaite et al. | 455/558 |
| 2006/0144932 A1 * | 7/2006 | Bendeck et al. | 235/383 |

OTHER PUBLICATIONS

"Identification cards—Identification of issuers—Part 1: Numbering system," ISO/IEC 7812-1, pp. 1-12 (Oct. 15, 2006).
"Information technology—Identification cards—Financial transaction cards," ISO/IEC 7813, pp. 1-12 (Jul. 1, 2006).
"Identification cards—Contactless integrated circuit(s) cards—Proximity cards—Part 4: Transmission protocol," ISO/IEC 14443-4, pp. 1-39 (Mar. 10, 2000).

* cited by examiner

*Primary Examiner* — Tuyen K Vo
(74) *Attorney, Agent, or Firm* — Jenkins, Wilson, Taylor & Hunt, P.A.

(57) ABSTRACT

Methods, systems, and computer program products for acquiring payment device data for wireless payment transactions are disclosed. According to one method, a request from a wireless payment reader for standardized payment device data for effecting a wireless payment is received by a wireless smart payment device. Payment device data elements are assembled by the wireless smart payment device into the standardized payment device data. The standardized payment device data are sent by the wireless smart payment device to the wireless payment reader.

42 Claims, 3 Drawing Sheets

METHODS, SYSTEMS AND COMPUTER PROGRAM PRODUCTS FOR WIRELESS PAYMENT TRANSACTIONS

CROSS-REFERENCE TO RELATED APPLICATIONS

This application claims the benefit of U.S. Provisional Patent Application Ser. No. 60/834,224, filed Jul. 28, 2006; the disclosure of which is incorporated herein by reference in its entirety.

TECHNICAL FIELD

The subject matter described herein relates to acquiring payment device data from smart payment devices for effecting wireless payment transactions. More particularly, the subject matter described herein relates to methods, systems, and computer program products for assembling standardized payment device data on a smart payment device for sending to a wireless payment reader to effect a wireless payment transaction.

BACKGROUND

Until recently, nearly all payment cards in the United States were magnetic strip based. In fact, magnetic strip cards are still in use all over the world. There are common definitions for the data on magnetic strip cards, which are defined by ISO standards (e.g., ISO 7812, ISO 7813, etc.). The entire infrastructure of the payment networks is geared towards handling the data from magnetic strip cards, in particular the Track 1 and Track 2 data as read from a magnetic strip card.

Track 1, devised by the International Air Transport Association (IATA), can store more information than Track 2 and contains the cardholder's name, account number, and other discretionary data. This track is sometimes used by the airline industry, for example, when securing reservations with a credit card. Track 2, devised by the American Banking Association (ABA), is currently most commonly used, though there is some suggestion of a move to Track 1 as the standard. Track 2 is most commonly read by ATMs and credit card checkers. The ABA designed the specifications of this track as a standard to which all world banks presently abide. It contains the cardholder's account, encrypted PIN, and other discretionary data.

Wireless smart payment devices are becoming more prevalent in the marketplace. A "wireless smart payment device", as used herein, refers to a device with processing capabilities usable for wireless payments. In some implementations, a smart wireless payment device may include an operating system for supporting a software application for a payment function.

Wireless smart payment devices may interact with wireless readers to enable transactions involving the wireless smart payment device. Examples of wireless smart payment devices include mobile phones, smart phones, key fobs, physical cards, personal digital assistants with interfaces to local card readers, and devices provisioned with a soft card. As used herein, the term "soft card" refers to a software-implemented payment, loyalty, membership or other card that is loadable onto a device with wireless communications capabilities.

Presently, the data recovered from wireless smart payment devices is assembled by a wireless reader into an image of the Track 1 and Track 2 data for use by point of sale (POS) terminals and from there onto the payment networks to effect payment. Initially, data recovered from these payment devices are not Track 1 or Track 2 assembled data. The data are composed of the payment device data elements of Track 1 and Track 2, such as the 16 digit personal account number (PAN), the name field, the expiration date of the card, the service code for the card, the personal identification number (PIN) indicator, a PIN verification value (PVV), a card validation value (CVV), etc. Thus, multiple reads by the reader from the payment device are required to recover all of the needed information. The wireless reader is then responsible for assembling the data correctly to create the complete Track 1 and Track 2 data.

Frequently, the payment device tells the reader how many characters of the data should be used in assembling the track data and also where it is to start in the track data. This level of sophistication required in the reader increases its complexity. Further, at present all issuers of wireless payment devices have defined and used their own software applications. This makes the task of designing readers even more difficult, because each wireless payment device to be supported by a reader requires its own code base to process the data coming from the payment device and format it correctly for use on payment networks. Thus, designing a reader to support multiple wireless payment device types greatly increases reader complexity.

Accordingly, in light of these problems with conventional wireless payment card data transmission methods, there exists a need for improved methods, systems, and computer program products for acquiring payment data from wireless smart payment devices, including payment devices of different types, by wireless readers for wireless payment transactions.

SUMMARY

Methods, systems, and computer program products for wireless payment transactions are disclosed. As used herein, the phrase "wireless payment transactions" refers to communications related to payment transactions that occur via an electric and/or magnetic field between a device and a device reader. One type of wireless communications that can be used between a payment device and a payment device reader is near field communications. Near field communications typically occur at a distance of about 2 to 4 inches between the device and the device reader. Near field communications commonly uses the ISO 14443 interface for payment transactions, although other standards could be used.

According to one aspect of the presently disclosed subject matter, a method of acquiring payment data for a wireless payment transaction is provided. A request from a wireless payment reader for standardized payment device data for effecting a wireless payment is received by a wireless smart payment device. The wireless smart payment device assembles payment device data elements into the standardized payment data. The wireless smart payment device sends to the wireless payment reader the standardized payment data.

The presently disclosed subject matter further provides a wireless smart payment device. The wireless smart payment device can comprise a payment device data storage application comprising payment device data elements. The wireless smart payment device can further comprise a payment device data assembly application. The payment device data assembly application assembles the payment device data elements into standardized payment device data for providing to a wireless payment reader.

A wireless payment reader is also provided by the presently disclosed subject matter. The wireless payment reader can comprise a payment device data request application for requesting standardized payment device data from a wireless smart payment device. The wireless payment reader can further comprise a payment device data receive application for receiving the standardized payment device data from the wireless smart payment device. The standardized payment device data includes a plurality of data elements assembled by the wireless smart payment device for effecting a wireless payment.

A system for acquiring payment device data for a wireless payment transaction is further provided by the subject matter disclosed herein. In some embodiments, the system comprises a wireless payment reader for requesting standardized payment device data from a wireless smart payment device and for receiving the standardized payment device data from the wireless smart payment device. The system further comprises a wireless smart payment device for storing payment device data elements, for receiving a request from the wireless payment reader for the standardized payment device data, for assembling payment device data elements into the standardized payment device data, and for sending to the wireless payment reader the standardized payment device data.

The methods and systems described herein for wireless payment transactions can be implemented using a computer program product comprising computer executable instructions embodied in a computer readable medium. Exemplary computer readable media suitable for implementing the subject matter described herein include chip memory devices, disk memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

The presently disclosed subject matter includes methods, systems and computer program products for wireless payment transactions. Specifically, the presently disclosed subject matter provides a wireless payment application which can be used by any known payment device carrying payment device data elements that can be configured into standardized payment device data streams, such as for example Track 1 and/or Track 2 data, for networks. The design preserves the security features of the payment device application designs and presents the data to the wireless payment reader in such a way that only a generic read command, and in some embodiments a single read command, is required to gather the data for Track 1 and Track 2 of the payment device information. In this way, only a single reader code module (or "payment device data receive application") is required to read any of a variety of different payment device types with this application installed, including payment devices from different issuers, different brands, or comprising different computer code.

The presently disclosed subject matter provides for moving the data assembly part of the transaction process onto the payment device itself, rather than on the reader. In contrast, other applications currently utilized in the field of wireless payment transactions assemble all the payment device data elements into Track 1 and/or Track 2 data on the reader. For example, prior to the presently disclosed subject matter, a payment device would contain all of the data necessary to create the Track 1 data. However, it was stored as the PAN, Name field, expiry date, service code, etc. and not directly as Track 1 data. Thus, a separate read operation would be required to get each data element from the card to the reader. Further, for some payment devices the response from the reader on a given item will include the item itself, the number of characters of the item to be used in the Track 1 data, and the starting location of the item when it is assembled into the full Track 1 data. Finally, after the reader has assembled all of the data into Track 1 format it could then be transmitted to the POS terminal. Because of the number of reads and interactions required between the payment device and the reader, the length of time to get all of the data is increased. Also, the amount of code in the reader to handle the data and assemble it correctly is increased as well.

Figure 1:
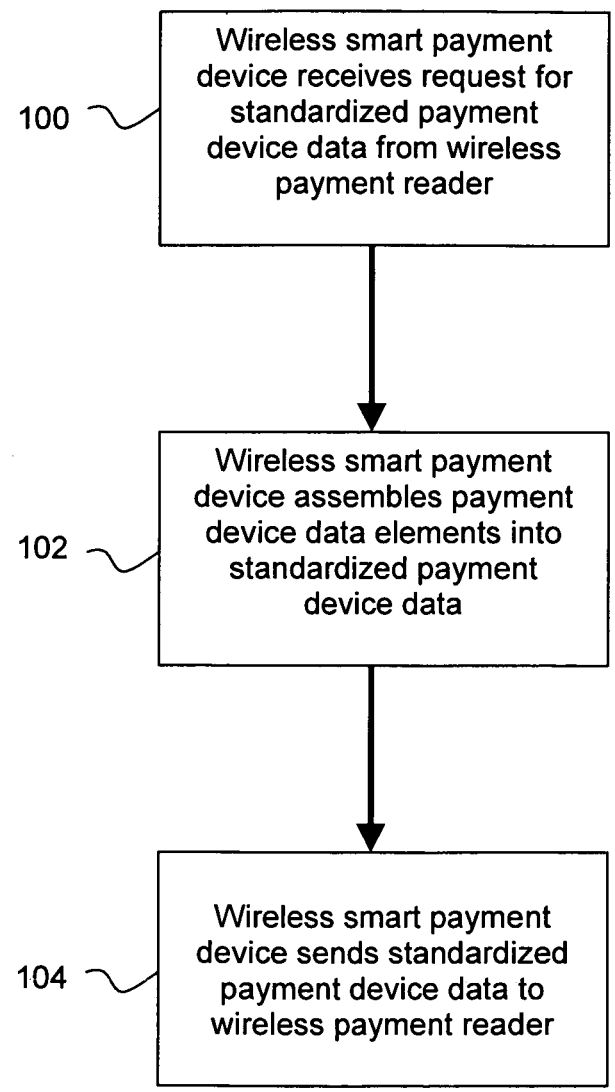
FIG. 1 is a flow chart illustrating exemplary overall steps for acquiring payment device data for a wireless payment transaction according to an embodiment of the subject matter described herein.

FIG. 1 is a flowchart illustrating exemplary overall steps for acquiring payment device data for a wireless payment transaction by a wireless payment reader from a wireless smart payment device according to an embodiment of the subject matter described. Referring to FIG. 1, in step 100, a wireless payment reader sends a request for standardized payment device data, which is received by a wireless smart payment device. The standardized payment device data requested may be Track 1 data, Track 2 data, Track 1 and Track 2 data, or other data defined by a standards document, a standards body, or industry, for effecting a wireless payment transaction.

In response to the request for standardized payment device data the wireless smart payment device, in step 102, assembles various payment device data elements into standardized payment device data. The payment device data elements can include, for example, a PAN, a user name, an expiry date, a service code, a PIN indicator, a PVV, a CVV, and combinations thereof. The assembly of standardized payment device data elements into the standardized payment device data of step 102 can occur substantially or completely on the wireless smart payment device. That is, in one implementation, none of the data assembly occurs on the wireless payment reader. In an alternate implementation, substantially all of the standardized payment device data may be assembled on the wireless smart payment device, and final assembly may occur elsewhere, such as on the reader or in a payment network.

In some embodiments, one or more of the payment device data elements are statically encoded on the smart payment device. In other embodiments, one or more of the payment device data elements are generated dynamically by the wireless smart payment device, such as for example, the PIN indicator, the PVV, and/or CVV.

In step 104 of FIG. 1, the wireless smart payment device sends the assembled standardized payment device data to the wireless payment reader. In some embodiments, only a single request from the wireless payment reader is required in order to achieve assembly of the standardized payment device data elements into the standard payment device data on the wireless smart payment device and sending of the standardized payment device data to the wireless payment reader. In contrast, conventional wireless payment methods require multiple requests by the reader and multiple sends by the payment device of data elements prior to assembly on the reader of the data elements into the standardized payment device data. Further, in some embodiments, the wireless payment reader comprises a generic application for receiving these standardized payment device data from a plurality of different types of wireless smart payment devices, including payment devices from different issuers and different brands. Thus, compared to conventional methods, the complexity of the reader required to handle interactions with different payment devices is greatly reduced.

Figure 2:
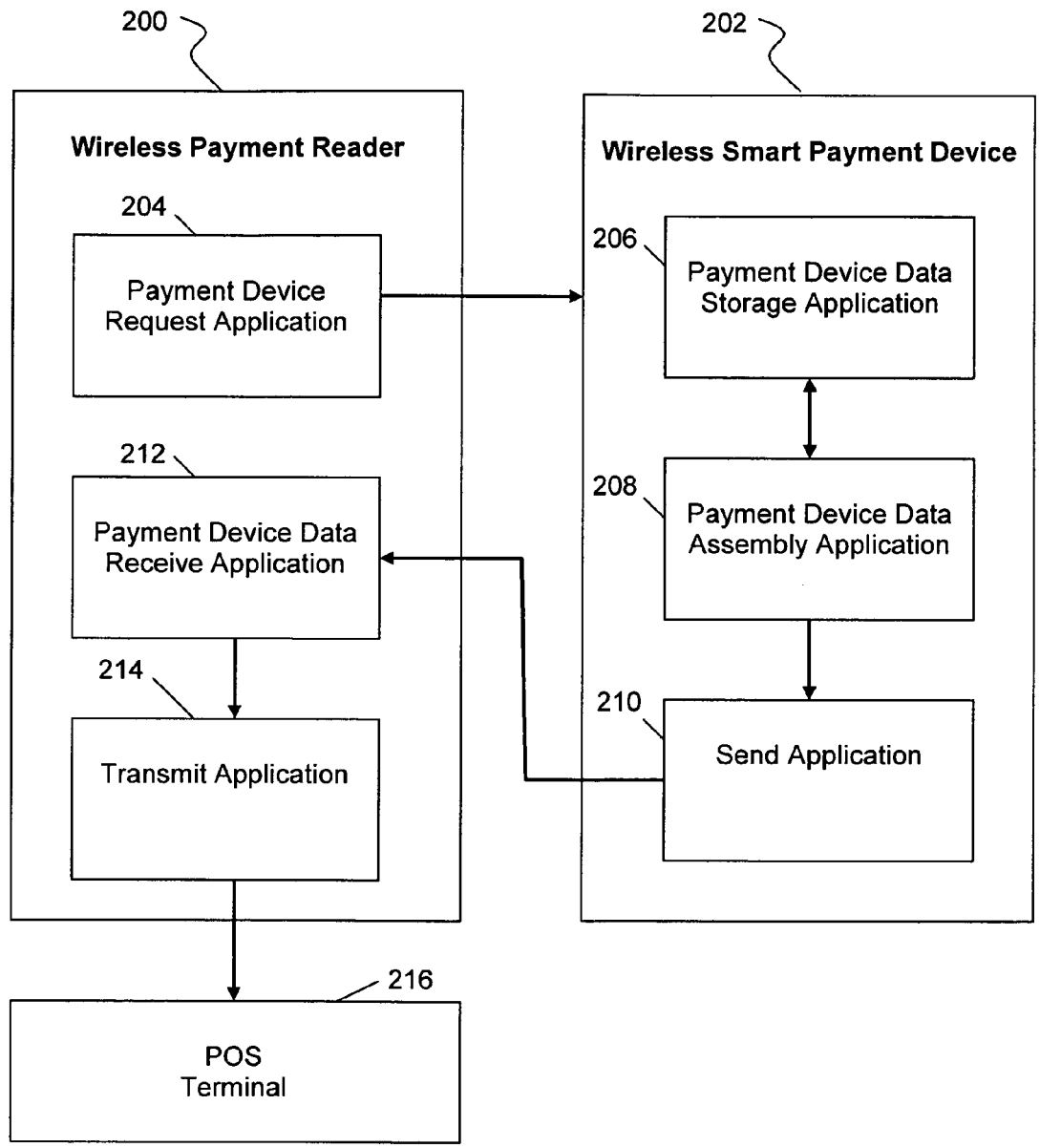
FIG. 2 is a block diagram of a system comprising a wireless payment reader and a wireless smart payment device for acquiring payment device data for a wireless payment transaction according to an embodiment of the subject matter described herein.

FIG. 2 is a block diagram of a system for acquiring standardized payment device data for a wireless payment transaction comprising a wireless payment reader 200 and a wireless smart payment device 202 according to an embodiment of the subject matter described herein. Referring to FIG. 2, wireless payment reader 200 can request standardized payment device data from wireless smart payment device 202 and receive the standardized payment device data from wireless smart payment device 202. Wireless smart payment device 202 stores payment device data elements. Wireless smart payment device 202 receives requests from wireless payment reader 200 for standardized payment device data and can assemble the payment device data elements into standardized payment device data. Wireless smart payment device 202 sends to the wireless payment reader the standardized payment device data.

In the system illustrated in FIG. 2, wireless payment reader 200 includes a payment device request application 204 that sends a request to wireless smart payment device 202 for standardized payment device data. Upon receipt of the request from wireless payment reader 200, wireless smart payment device 202 assembles payment device data elements stored in a payment device data storage application 206 utilizing a payment device data assembly application 208, which may be contained entirely on the wireless smart payment device 202. Once payment device data assembly application 208 has assembled the payment device data elements stored in payment device data storage application 206 into standardized payment device data, wireless smart payment device utilizes a send application 210 to send the standardized payment device data to wireless payment reader 200 in response to the request from wireless payment reader 200. As illustrated in FIG. 2, in some embodiments, wireless payment reader 200 need only make a single request for standardized payment device data from wireless smart payment device 202 in order to receive the assembled standardized payment device data.

As further shown in FIG. 2, the standardized payment device data sent by wireless smart payment 202 is accepted by a payment device data receive application 212 on wireless payment reader 200. The standardized payment device data is then transmitted by a transmit application 214 on wireless payment reader 200 to a POS terminal 216, which then processes the standardized payment device data to thereby effect the requested wireless payment transaction.

Since wireless smart payment device 202 has provided directly to wireless payment reader 200 the standardized payment device data, wireless payment reader 200 is not required to make multiple requests for data elements from wireless payment device 202, spend extra time assembling the individual elements into standardized data acceptable to the POS terminal, or maintain instruction code to assemble the data elements from a variety of different payment devices. As such, wireless payment reader 200 need only transmit standardized payment device, such as Track 1 and/or Track 2 data to POS terminal 216 after making a single request of the smart payment device 202 for the standardized data. Thus, since wireless smart payment device 202 sends standardized payment device data, regardless of the type of payment device, payment device data receive application 212 can comprise a generic application for receiving this standardized payment device data from a plurality of different wireless smart payment device types.

In some embodiments, wireless smart payment device 202 can be, for example, a mobile telephone, a smart phone, a key fob, a physical card, a personal digital assistant, or a device provisioned with a soft card. In some particular embodiments, the wireless smart payment device is a debit card and/or a credit card.

Figure 3:
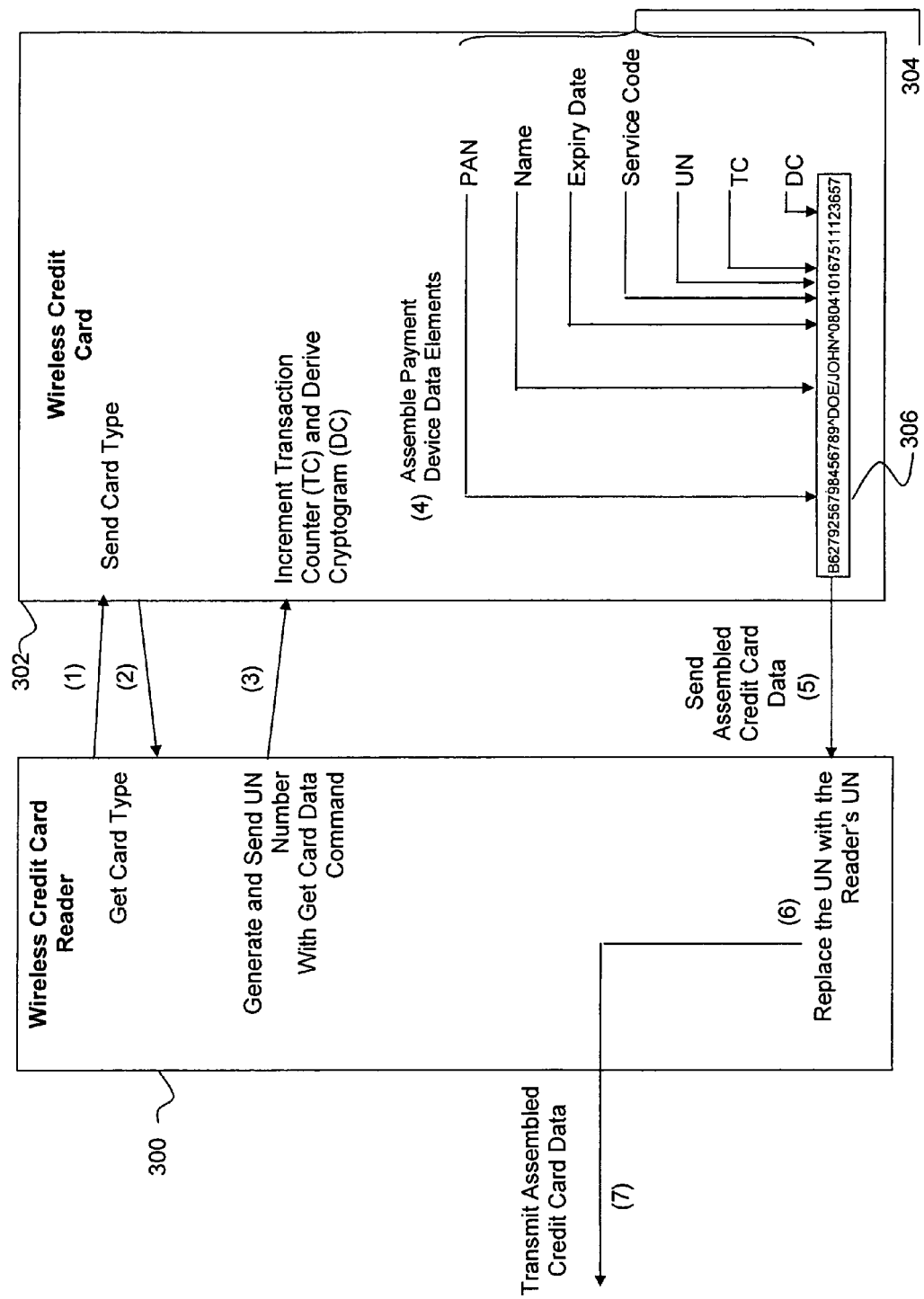
FIG. 3 is a detailed block diagram illustrating an exemplary embodiment for conducting a wireless payment transaction according to the subject matter described herein.

FIG. 3 is a block diagram and exemplary system for acquiring payment device data for a wireless payment transaction according to a particular embodiment of the subject matter of FIG. 2 and related disclosure. The exemplary embodiment illustrated in FIG. 3 includes a wireless credit card reader and a wireless credit card for effecting wireless payment transactions. Referring to FIG. 3, initially a wireless credit card reader 300 in step (1) sends a card type identifier command to a wireless credit card 302. In response, wireless credit card 302 sends a card type identifier in step (2) to wireless credit card reader 300.

After receipt of the card type, wireless credit card reader 300 in step (3) generates and sends a challenge number (e.g., an Unknown Number (UN)) along with a Get Card Data command (see step (5)) to wireless credit card 302. Wireless credit card 302 in response to the received challenge number increments an internal transaction counter (TC) and then generates a cryptogram (the "Derived Cryptogram" (DC)) based, in part, on the challenge number and the transaction number from the TC, which is used for insuring the payment transaction remains secure throughout the process. Cryptogram-based security systems are well-known in the art and a person of ordinary skill in the art would appreciate the various methods for generating cryptograms for use in secure transactions. For example, wireless credit card 302 can combine the challenge number using a mathematical algorithm with one or more payment device data elements 304, such as a transaction counter and the PAN to generate a (DC), which can be transmitted to a POS terminal as part of the standardized payment device data, e.g. card track data 306, to verify authenticity of the wireless credit card.

In FIG. 3, wireless credit card 302 assembles payment device elements 304 into the requested standardized payment device data 306. In some embodiments, the standardized payment device data can be Track 1 and/or Track 2 data.

In step (6) of FIG. 3, wireless credit card 302 sends card track data 306 (e.g., Track 1 and/or Track 2 data) to wireless credit card reader 300, where it is received.

Wireless credit card reader 300 then replaces the UN part of the received card track data 306 from wireless credit card 302 with the known UN number that was transmitted to wireless credit card 302 in step (3). This insures that copy and replay devices that capture a card output cannot be used in a subsequent transaction where the UN number was different. This is so because the current UN number would not likely pass the host's DC check.

Wireless credit card reader 300 then transmits, in step (7), assembled card track data 306 to a POS terminal, which then effects the wireless payment transaction.

As previously noted, the presently disclosed system works with both static and dynamic generation of payment device data elements, such as for example pin indicators, PVVs and/or CVVs. Furthermore, the method of arranging the data is entirely up to the wireless smart payment device and can be changed by the issuing entity at will except that the UN number should be in the same location. The security features and encryption keys that create, for example, the derived cryptogram are completely hidden and can be different for each issuer without changing the code required to read the card in the wireless reader. Also the number of digits in the TC and the DC can vary from one issuer to the next without impact to the ability of the reader to get the data from the wireless device.

It will be understood that various details of the presently disclosed subject matter may be changed without departing from the scope of the present subject matter. Furthermore, the foregoing description is for the purpose of illustration only, and not for the purpose of limitation.

What is claimed is:

1. A method of acquiring payment device data for a wireless payment transaction, the method comprising:
   (a) receiving, by a wireless smart payment device, a request from a wireless payment reader for standardized payment device data for effecting a wireless payment;
   (b) assembling, by the wireless smart payment device, payment device data elements into the standardized payment device data, wherein the standardized payment device data includes a complete set of Track 1 data in Track 1 format; and
   (c) sending, by the wireless smart payment device, to the wireless payment reader, the standardized payment device data, wherein the request from the wireless payment reader is a single request resulting in receipt by the wireless payment reader of the complete set of Track 1 data assembled in Track 1 format.

2. The method of claim 1, wherein the wireless smart payment device comprises a device selected from a group consisting of a mobile telephone, a smart phone, a key fob, a physical card, a personal digital assistant, and a device provisioned with a soft card.

3. The method of claim 1, wherein the wireless smart payment device comprises a debit card or a credit card.

4. The method of claim 1, wherein the wireless payment reader comprises a generic application for receiving the standardized payment device data from a plurality of different wireless smart payment device types.

5. The method of claim 1, wherein the standardized payment device data comprises Track 2 data.

6. The method of claim 1, wherein assembling the standardized payment device data occurs substantially on the wireless smart payment device.

7. The method of claim 1, wherein the at least one other data element comprises at least one of a user name, an expiry date, a service code, a pin indicator, a PIN verification value (PVV), a card validation value (CVV), and combinations thereof.

8. The method of claim 7, wherein one or more of the payment device data elements are generated dynamically by the smart payment device.

9. The method of claim 1, comprising, prior to receiving the request for the standardized payment device data:
   (a) sending, by the wireless payment reader, a card type identifier command to the wireless smart payment device;
   (b) receiving, by the wireless payment reader, a card type identifier from the wireless smart payment device;
   (c) sending, by the wireless payment reader, a challenge number to the wireless smart payment device; and
   (d) generating, by the wireless smart payment device, a cryptogram in response to the challenge number.

10. The method of claim 1 wherein the request from the wireless payment reader comprises a single read command and wherein the standardized payment device data is sent by the wireless smart payment device to the wireless payment device reader in a single transmission.

11. A wireless smart payment device, comprising:
    (a) a payment device data storage application for storing payment device data elements; and
    (b) a payment device data assembly application, wherein the payment device data assembly application assembles the payment device data elements into standardized payment device data for providing to a wireless payment reader, wherein the standardized payment device data includes a complete set of Track 1 data in Track 1 format, wherein the payment device data assembly application assembles and transmits, to the wireless payment reader, the complete set of Track 1 data in Track 1 format in response to a single request from the wireless payment reader.

12. The wireless smart payment device of claim 11, comprising a send application for sending the standardized payment device data to the wireless payment reader.

13. The wireless smart payment device of claim 11, wherein the wireless smart payment device comprises a device selected from a group consisting of a mobile telephone, a smart phone, a key fob, a physical card, a personal digital assistant, and a device provisioned with a soft card.

14. The wireless smart payment device of claim 11, wherein the wireless smart payment device comprises a debit card or a credit card.

15. The wireless smart payment device of claim 11, wherein at least one other data element includes at least one of a user name, an expiry date, a service code, a pin indicator, a PIN verification value (PVV), a card validation value (CVV), and combinations thereof.

16. The wireless smart payment device of claim 15, wherein one or more of the payment device data elements are generated dynamically by the smart payment device.

17. The wireless smart payment device of claim 11, wherein the standardized payment device data comprises Track 2 data.

18. The wireless smart payment device of claim 11 wherein the payment device data assembly application assembles the payment device data elements into the standardized payment device data in response to a single read command and wherein the standardized payment device data is sent by the wireless smart payment device to the wireless payment device reader in a single transmission.

19. A wireless payment reader, comprising:
    (a) a payment device data request application for requesting, from a wireless smart payment device, standardized payment device data including a plurality of assembled data elements for effecting a wireless payment, wherein the standard payment device data includes a complete set of Track 1 data assembled in Track 1 format, wherein the payment device request application is configured to generate a single request for the standardized payment device data and to transmit the single request to the wireless smart payment device; and (b) a payment device data receive application for receiving, from the wireless smart payment device, the standardized payment device data assembled by the wireless smart payment device, wherein the standardized payment device data assembled by the wireless smart payment device includes a complete set of Track 1 data assembled in Track 1 format and transmitted by the wireless smart payment device in response to the single request from the payment device data request application.

20. The wireless payment reader of claim 19, comprising a transmit application for transmitting the standardized payment device data to a point of sale (POS) terminal.

21. The wireless payment reader of claim 19, wherein the standardized payment device data comprises Track 2 data.

22. The wireless payment reader of claim 19, wherein the payment device data receive application comprises a generic application for receiving the standardized payment device data from a plurality of different wireless smart payment device types.

23. The wireless payment reader of claim 19, wherein the payment device data receive application is adapted to receive the standardized payment device data in response to a single request issued by the payment device data request application.

24. The wireless payment reader of claim 19, wherein the wireless payment reader is adapted to replace a received Unknown Number (UN) from the wireless payment device with a known UN number that was previously transmitted to the wireless payment device by the wireless payment reader.

25. The wireless payment reader of claim 19 wherein the payment device data request application sends a single read command to the wireless smart payment device and, in response to the single read command, the payment device data receive application receives the standardized payment device data in a single transmission from the wireless smart payment device.

26. A system for acquiring payment device data for a wireless payment transaction, the system comprising:
(a) a wireless payment reader for sending a request for standardized payment device data from a wireless smart payment device and for receiving the standardized payment device data from the wireless smart payment device; and
(b) the wireless smart payment device for storing payment device data elements, for receiving a request from the wireless payment reader for the standardized payment device data, for assembling payment device data elements into the standardized payment device data, and for sending to the wireless payment reader the standardized payment device data, wherein the standardized payment device data includes a complete set of Track 1 data in Track 1 format, wherein the request from the wireless payment reader is a single request resulting in receipt by the wireless payment reader of the complete set of Track 1 data assembled in Track 1 format.

27. The system of claim 26, wherein the wireless payment reader comprises a generic application for receiving the standardized payment device data from a plurality of different wireless smart payment device types.

28. The system of claim 26, wherein the standardized payment device data comprises Track 2 data.

29. The system of claim 26, wherein the wireless smart payment device comprises a device selected from a group consisting of a mobile telephone, a smart phone, a key fob, a physical card, a personal digital assistant, and a device provisioned with a soft card.

30. The system of claim 26, wherein the wireless smart payment device comprises a debit card or a credit card.

31. The system of claim 26 wherein the wireless payment reader sends a single read command to the wireless smart payment device and, in response to the single read command, the wireless smart payment device transmits the standardized payment device data in a single transmission to the wireless payment reader.

32. A computer program product comprising computer executable instructions embodied in a computer readable medium for performing steps comprising:
(a) receiving, by a wireless smart payment device, a request from a wireless payment reader for standardized payment device data for effecting a wireless payment;
(b) assembling, by the wireless smart payment device, payment device data elements into the standardized payment device data, wherein the standardized payment device data includes a complete set of Track 1 data in Track 1 format; and
(c) sending, by the wireless smart payment device, to the wireless payment reader, the standardized payment device data, wherein the request from the wireless payment reader is a single request resulting in receipt by the wireless payment reader of the complete set of Track 1 data assembled in Track 1 format.

33. The computer program product of claim 32, wherein the wireless smart payment device comprises a device selected from a group consisting of a mobile telephone, a smart phone, a key fob, a physical card, a personal digital assistant, and a device provisioned with a soft card.

34. The computer program product of claim 32, wherein the wireless smart payment device comprises a debit card or a credit card.

35. The computer program product of claim 32, wherein the request from the wireless payment reader is a single request resulting in receipt by the wireless payment reader of the standardized payment device data.

36. The computer program product of claim 32, wherein the wireless payment reader comprises a generic application for receiving the standardized payment device data from a plurality of different wireless smart payment device types.

37. The computer program product of claim 32, wherein the standardized payment device data comprises Track 2 data.

38. The computer program product of claim 32, wherein assembling the standardized payment device data occurs substantially on the wireless smart payment device.

39. The computer program product of claim 32, wherein the at least one other data element comprises at least one of a user name, an expiry date, a service code, a Transaction Counter (TC), a derived cryptogram (DC), and combinations thereof.

40. The computer program product of claim 39, wherein one or more of the payment device data elements are generated dynamically by the smart payment device.

41. The computer program product of claim 32, comprising, prior to receiving the request for the standardized payment device data:
(a) sending, by the wireless payment reader, a card type identifier command to the wireless smart payment device;
(b) receiving, by the wireless payment reader, a card type identifier from the wireless smart payment device;
(c) sending, by the wireless payment reader, a challenge number to the wireless smart payment device; and (d) generating, by the wireless smart payment device, a cryptogram in response to the challenge number.

42. The computer program product of claim 32 wherein the request from the wireless payment reader comprises a single read command and wherein the standardized payment device data is sent by the wireless smart payment device to the wireless payment device reader in a single transmission.

* * * * *